US010569225B2

(12) United States Patent
Li et al.

(10) Patent No.: US 10,569,225 B2
(45) Date of Patent: Feb. 25, 2020

(54) PERISTALTIC PUMP MICROFLUIDIC SEPARATOR (71) Applicants: National Research Council of Canada, Ottawa (CA); The Royal Institution for the Advancement of Learning/McGill University, Montreal (CA)

(72) Inventors: Kebin Li, Longueuil (CA); Teodor Veres, Montreal (CA); Tohid Fatanat Didar, Montreal (CA); Maryam Tabrizian, Longueuil (CA)

(73) Assignees: National Research Council of Canada, Ottawa, Ontario (CA); The Royal Institution for the Advancement of Learning/McGill University, Montreal, Quebec (CA)

( * ) Notice: Subject to any disclaimer, the term of this patent is extended or adjusted under 35 U.S.C. 154(b) by 530 days.

(21) Appl. No.: 14/779,446

(22) PCT Filed: Mar. 27, 2014

(86) PCT No.: PCT/IB2014/060234
§ 371 (c)(1),
(2) Date: Sep. 23, 2015

(87) PCT Pub. No.: WO2014/155343
PCT Pub. Date: Oct. 2, 2014

(65) Prior Publication Data
US 2016/0051935 A1    Feb. 25, 2016

Related U.S. Application Data (60) Provisional application No. 61/806,127, filed on Mar. 28, 2013.

(51) Int. Cl.
*G01N 1/10*        (2006.01)
*B01D 63/08*       (2006.01)
(Continued)

(52) U.S. Cl.
CPC .......... *B01D 63/088* (2013.01); *B01D 65/02* (2013.01); *B01D 69/10* (2013.01); *F04B 43/043* (2013.01);
(Continued)

(58) Field of Classification Search
CPC ... G01N 2015/1081; G01N 2021/7763; G01N 2015/149
(Continued)

(56) References Cited

U.S. PATENT DOCUMENTS 8,186,913 B2    5/2012   Toner
8,208,138 B2    6/2012   Papautsky
(Continued)

OTHER PUBLICATIONS

Chen-Chen Lin, Angela Chen, Che-Hsin Lin—"Microfluidic Cell Counter/Sorter Utilizing Multiple Particle Tracing Technique and Optically Switching Approach", Biomed Microdevices, 2008, 10, 55-63, National Sun Yat-sen University, Taiwan, Springer Science Publisher, First Published IEEE, Daegu, Korea, 2006.
(Continued)

*Primary Examiner* — Natalia Levkovich
(74) *Attorney, Agent, or Firm* — Jason E. J. Davis; National Research Council of Canada (57) ABSTRACT

A technique for separating components of a microfluid, comprises a self-intersecting micro or nano-fluidic channel defining a cyclic path for circulating the fluid over a receiving surface of a fluid component separating member; and equipment for applying coordinated pressure to the channel at a plurality of pressure control areas along the cyclic path to circulate the fluid over the receiving surface, applying a
(Continued)

pressure to encourage a desired transmission through the separating member, and a circulating pressure to remove surface obstructions on the separating member. The equipment preferably defines a peristaltic pump. Turbulent microfluidic flow appears to be produced.

15 Claims, 6 Drawing Sheets

(51) Int. Cl.
| | |
|---|---|
| B01D 69/10 | (2006.01) |
| F04B 43/04 | (2006.01) |
| F04B 43/14 | (2006.01) |
| B01D 65/02 | (2006.01) |
| F04B 43/12 | (2006.01) |
| F04B 53/10 | (2006.01) |

(52) U.S. Cl.
CPC .......... *F04B 43/1223* (2013.01); *F04B 43/14* (2013.01); *F04B 53/10* (2013.01); *B01D 2313/243* (2013.01)

(58) Field of Classification Search
USPC .................................. 436/177, 178, 179, 180
See application file for complete search history.

(56) References Cited

U.S. PATENT DOCUMENTS

| | | | | |
|---|---|---|---|---|
| 2003/0008308 | A1* | 1/2003 | Enzelberger | B01F 5/102 435/6.19 |
| 2005/0232817 | A1 | 10/2005 | Ahn | |
| 2008/0281090 | A1* | 11/2008 | Lee | B01F 11/0042 536/122 |
| 2009/0071541 | A1 | 3/2009 | Gilbert | |
| 2012/0292253 | A1 | 11/2012 | Leonard | |

OTHER PUBLICATIONS

Chia-Weia Lai, Yen-Heng Lin, Gwo-Bin Lee—A Microfluidic Chip for Formation and Collection of Emulsion Droplets Utilizing Active Pneumatic Micro-Choppers and Micro-Switches, Biomed Microdevices, 2008, 10, 749-756, National Cheng Kung University, Tainan, Taiwan, Springer Science Publisher.
Andreas Lenshof, Thomas Laurell—"Continuous Separation of Cells and Particles in Microfluidic Systems", Chemical Society Reviews, 2010, 39, 1203-1217, Lund, Sweden.
Alexandr Jonas, Pavel Zemanek—"Light at Work: The use of Optical Forces for Particle Manipulation, Sorting, and Analysis", Electrophoresis, 2008, 29, 4813-4851, Institute of Scientific Instruments, Czech Republic.
Junjie Zhu, Tzuen-Rong J. Tzeng, Xiangchun Xuan—"Continuous Dielectrophoretic Separation of Particles in a Spiral Microchannel", Electrophoresis 2010, 31, 1382-1388, Clemson University, Clemson, SC, USA, InterScience Publisher.
Enver Kerem Dirican, Osman Denizhan Ozgun, Suleyman Akarsu, Kadir Okhan Akin, Ozge Ercan, Mukaddes Ugurlu, Cagri Camsari, Oya Kanyilmaz, Adnan Kaya, Ali Unsal—"Clinical Outcome of Magnetic Activated Cell Sorting of Non-apoptotic Spermatozoa Before Density Gradient Centrifugation for Assisted Reproduction", Journal of Assisted Reproduction and Genetics, 2008, 25, 375-381, Ankara, Turkey, Springer Science Publisher.
Yao Zhou, Yi Wang, Qiao Lin—"A Microfluidic Device for Continuous-Flow Magnetically Controlled Capture and Isolation of Microparticles", Journal of Microelectromechanical Systems, vol. 19, No. 4, Aug. 2010, IEEE Publisher.
Andreas Nilsson, Filip Petersson, Henrik Jonsson, Thomas Laurell—"Acoustic Control of Suspended Particles in Micro Fluidic Chips", Lab Chip, 2004, 4, 131-135, The Royal Society of Chemistry, Lund, Sweden.
Junya Takagi, Masumi Yamada, Masahiro Yasuda, Minoru Seki—"Continuous Particle Separation in a Microchannel Having Asymmetrically Arranged Multiple Branches", Lab Chip, 2005, 5, 778-784, The Royal Society of Chemistry.
Irena Barbulovic-Nad, Xiangchun Xuan, Jacky S. H. Lee, Dongqing Li—"DC-dielectrophoretic Separation of Microparticles Using an Oil Droplet Obstacle", Lab Chip, 2006, 6, 274-279, The Royal Society of Chemistry.
Sun Min Kim, Sung Hoon Lee, Kahp Yang Suh—"Cell Research with Physically Modified Microfluidic Channels: A Review", Lab Chip, 2008, 8, 1015-1023, The Royal Society of Chemistry.
Yiqi Luo, Richard N. Zare—"Perforated Membrane Method for Fabricating Three-dimensional Polydimethylsiloxane Microfluidic Devices", Lab Chip, 2008, 8, 1688-1694, The Royal Society of Chemistry.
Sathyakumar S. Kuntaegowdanahalli, Ali Asgar S. Bhagat, Girish Kumar, Ian Papautsky—Inertial Microfluidics for continuous Particle Separation in Spiral Microchannels, Lab Chip, 2009, 9, 2973-2980, The Royal Society of Chemistry.
Tohid Fatanat Didar, Maryam Tabrizian—"Adhesion Based Detection, Sorting and Enrichment of Cells in Microfluidic Lab-on-Chip Devices", Lab Chip, 2010, 10, 3043-3053, The Royal Society of Chemistry.
David Issadore, Huilin Shao, Jaehoon Chung, Andita Newton, Mikael Pittet, Ralph Weissleder, Hakho Lee—"Self-assembled Magnetic Filter for Highly Efficient Immunomagnetic Separation", Lab Chip, 2011, 11, 147-151, The Royal Society of Chemistry.
Huibin Wei, Bor-han Chueh, Huiling Wu, Eric W. Hall, Cheuk-wing Li, Romana Schirhagl, Jin-Ming Lin, Richard N. Zare—"Particle Sorting Using a Porous Membrane in a Microfluidic Device", Lab Chip, 2011, 11, 238-245, The Royal Society of Chemistry.
Ali Asgar S. Bhagat, Han Wei Hou, Leon D. Li, Chwee Teck Lim, Jongyoon Han—"Pinched Flow Coupled Shear-modulated Inertial Microfluidics for High-throughput Rare Blood Cell Separation", Lab Chip, 2011, 11, 1870, The Royal Society of Chemistry.
Kazunori Hoshino, Yu-Yen Huang, Nancy Lane, Michael Huebschman, Jonathan W. Uhr, Eugene P. Frenkel, Xiaojing Zhang—"Microchip-based Immunomagnetic Detection of Circulating Tumor Cells", Lab Chip, 2011, 11, 3449, The Royal Society of Chemistry.
Mark M. Wang, Eugene Tu, Daniel E Raymond, Joon Mo Yang, Haichuan Zhang, Norbert Hagen, Bob Dees, Elinore M. Mercer, Anita H. Forster, Ilona Kariv, Philippe J. Marchand, William F. Butler—Microfluidic Sorting of Mammalian Cells by Optical Force Switching, Nature Biotechnology, vol. 23, No. 1, Jan. 2005, Genoptix Inc., San Diego, CA, USA.
Lotien Richard Huang, Edward C. Cox, Robert H. Austin, James C. Sturm—"Continuous Particle Separation Through Deterministic Lateral Displacement", Science, vol. 304, 987-990, May 2004, Princeton University, NJ, USA.
International Search Report of corresponding PCT application No. PCT/IB2014/060234.

* cited by examiner

(A) TPE gasket (B) BFL after injection molding

(C) BFL after inserting TPE gasket (D) BFL with sealed ML

PERISTALTIC PUMP MICROFLUIDIC SEPARATOR

This application is a national phase entry of International Patent Application No. PCT/IB2014/060234 filed Mar. 27, 2014 and claims the benefit of U.S. Provisional Patent Application Ser. No. 61/806,127 filed Mar. 28, 2013, the entire contents of both of which are herein incorporated by reference.

FIELD OF THE INVENTION

The present invention relates in general to microfluidic separation and filtration, and in particular to a three layer microfluidic structure with a peristaltic pump, above a filter, which is above a filtrate outlet, where the peristaltic pump provides for circular and vertical pressures for the fluid to avoid blockage and to improve the filtration.

BACKGROUND OF THE INVENTION

Filtration is an important operation in microfluidic devices. A variety of screening, purifying, cleaning, extracting, and like functions that depend on efficient are required for many lab on chip applications. Filtering herein amounts to systematically separating components of a microfluidic stream into filtrate and retentate microfluids, in dependence on a property of the species contained or entrained in the microfluidic stream, to yield higher concentrations of respective species in the filtrate and retentate microfluids than present in the microfluidic stream. To accomplish this, a filter or membrane is typically provided as a selective barrier between a channel for the microfluidic stream and retentate, and the filtrate.

U.S. Pat. No. 6,878,271 teaches the integration of conventional membrane filter technology into microfluidic systems. A variety of filtration systems are shown. It is stated (col. 6, line 35) in U.S. Pat. No. 6,878,271 that a (not illustrated) flow source "may comprise an off-chip syringe pump, a microfabricated peristaltic pump, a microfabricated syringe, or any suitable flow source known in the art, such as those described in U.S. Provisional Patent Application Ser. No. 60/391,868".

The major problem with filters/membranes and like separators is that they have limited efficiency. In the time the fluid spends at the surface, only some of the fluid will be separated as intended. Because the porosity of most commercially available filters are only in the range of 20% and because most of the microfluidic devices produce the laminar flow in microfluidic channels, 80% of the particles are generally blocked on the surface of the filter. The intended filtrate itself, in combination with the intended retentate, tend to clog pores of filters, further decreasing efficiency. Increasing a shear rate of the flow, and/or the pressure difference across the membrane can help to delay the clogging effect (see U.S. Pat. No. 4,871,462) and may drive intended filtrate through partially clogged perforations, to some degree, but still does not avoid the clogging issue. The higher the pressure drawing the filtrate relative to the retentate, the more quickly the membrane is clogged, resulting in low throughput after the clogging. The higher the pressure drawing the retentate relative to the filtrate, the less clogged the membrane, but less of the fluid that can pass through the separator actually passes through, resulting in lower efficiency. The solution to clogging inherently provided in U.S. Pat. No. 6,878,271 is 1) to provide a large filtration surface area, and 2) to replace the module frequently, but this may not be cost effective, and sometimes may not be practical (for example, if the filter is integrated into a microfluidic system).

Thus many techniques have been developed in the art of filtration; these can be generally categorized into active and passive techniques.[1-3] Active separation approaches improve separation using physical forces from external sources such as dielectrophoretic[4], optical[5-7], magnetic[8-11], or acoustic forces.[12] However, many of them are expensive, require external fields and power supplies, require pre-processing of the target particles, cannot be easily implemented in multiple levels of separation with high efficiency, and may not easily be miniaturized as required for microfluidic application.

On the other hand, passive separation approaches rely purely on microfluidic phenomena and the interaction of the fluid with the geometries of the microfluidic chip. It includes obstacle induced separation, hydrodynamic filtration[13-14], pinched flow fractionation[15], inertia and dean flow separation.[16-17] Pinches, weirs and posts are common microfluidic obstacles, which are arranged in microfluidic channels to act as filters, decreasing particles of some sizes and densities in certain areas, and increasing the concentration of such particles in other areas. Physical filtering is among the few separation techniques that do not require pre-processing steps or external stimuli such as magnetic or optical fields. U.S. Pat. No. 7,727,399 by Leonard et al. is one example of flow-based separation. When you have a well characterized fluid, and the separation problem is well circumscribed, there are numerous means for improving separation.

It is more difficult to provide a generic, multi-purpose fluid separation system that operates independently of flow rates, volumes, filtrate densities, etc. When designing a general purpose separator, most flow-based separation techniques are of limited use, because when the flow has a different constitution, the efficiency of the system is degraded.

Further to the problem of operational efficiency, there are problems in the art with fabrication, in that bonding of filters to substrates in microfluidic devices can be difficult. Sealing and bonding is especially problematic for thin membranes, which are otherwise very efficient and well suited to microfluidic applications. Especially if the membrane is fragile, as they tend to be if they are high throughput and have small pores. Bonding cannot be easily achieved with very fragile membranes in a cost and time effective way[18,19]. This limitation becomes even more important (although it may not be impossible to be realized) when multiple levels of membranes are required in order to implement multiple particle fractionations in the same device.

It is known in the art of macroscopic filtration, to recirculate fluid from a retentate stream to the supply of a filter in general, however flow control and loss of pressure across the membrane may require numerous pumps and flow control equipment to orchestrate this recirculation. Additional flow control equipment increases a cost of microfluidic devices. Accordingly there is a need for improved separation techniques for microfluidic devices.

SUMMARY OF THE INVENTION

Applicant has designed a microfluidic separator in a three layer microfluidic structure with a peristaltic pump layer having source and retentate channels, a separating member, and a filtrate outlet layer that exhibits a high efficiency, which is difficult to achieve in microfluidics where turbulence is difficult to induce. Low cost fabrication can be provided by using soft thermoplastic elastomers (TPEs) in alternation with harder layers. For example, substantial advantages in bonding and sealing the separating member can be provided using TPEs as the first and third layers.

The peristaltic pump layer provides at least three pressure control areas for exerting forces on segments of one or more interconnected microfluidic channels that overly a first surface of the separating member to permit fluid components of the channels to pass through the separating member. The pump layer is adapted to apply coordinated pressure at the at least three pressure control areas to ensure that the fluid experiences circulatory and through separator pressures within the one or more channels. The recirculation avoids blockage and improves the separation efficiency. The flow can typically be made to be turbulent, further increasing efficiency of the separation.

Accordingly a microfluidic separator is provided, the separator comprising a peristaltic pump coupled to a source and a retentate channel, a fluid component separating member, and a filtrate outlet, wherein: the peristaltic pump comprises at least three pressure control areas interconnected by at least one microfluidic or nanofluidic channel overlying the separating member, the at least one channel and pressure control areas defining a closed microfluidic circuit; and the separating member is located between the peristaltic pump and filtrate outlet with a first surface of the separating member coupled with the at least one channel, and a second surface of the separating member coupled with the filtrate outlet to selectively permit fluid components to pass from the at least one channel to the filtrate outlet.

Parts of the at least one channel, and filtrate outlet are preferably aligned in a net direction of pressure actuation exerted onto the pressure control area.

The peristaltic pump preferably comprises a thermoplastic elastomeric layer having a first patterned surface bonded to the separating member to define the closed microfluidic circuit.

An integrated microfluidic separator which can be used for separating/sorting more than two different sized particles is also disclosed. The integrated microfluidic separator comprises at least three layers defining two of the microfluidic separators. While it may be possible to align these in a stack, it is possible to arrange them side-by-side with the filtrate of the first microfluidic separator serving as a source of the next microfluidic separator.

Also accordingly, a method for separating components of a fluid is provided. The method comprises: providing a self-intersecting micro or nano-fluidic channel defining a cyclic path for circulating the fluid over a receiving surface of a fluid component separating member; and applying coordinated pressure to channel at a plurality of pressure control areas along the cyclic path to circulate the fluid over the receiving surface, applying a pressure to encourage a desired transmission through the separating member, and a circulating pressure to remove surface obstructions on the separating member.

The method may further comprise applying the coordinated pressure for a predefined duration, and continuously injecting the fluid into the channel as the filtrate leaves the channel.

After repeatedly injecting the fluid until the fluid is spent, or the retentate contains too much material that cannot pass through the separating member, the method may involve dispensing a flushing fluid to flush a retentate from the channel. The dispensing a flushing fluid may comprise actuating a valve to close a supply of the fluid, or a filtrate of the separating member, or to open a retentate outlet.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

The present invention relates to a microfluidic separator device with an integrated peristaltic pump. The separator improves separation efficiency and decreases clogging by driving the fluid both through the separator, and circulating the fluid around a channel that passes over the separator. The circulating force decreases clogging, and increases the dwell time of the source fluid adjacent the filter, and the through force encourages extraction of the filtrate. Herein filtrate refers to the fraction of the fluid supply that passes through the separator, and retentate refers to the fraction of the fluid supply that does not pass through the separator, regardless of the nature of the separator.

Figure 1A:
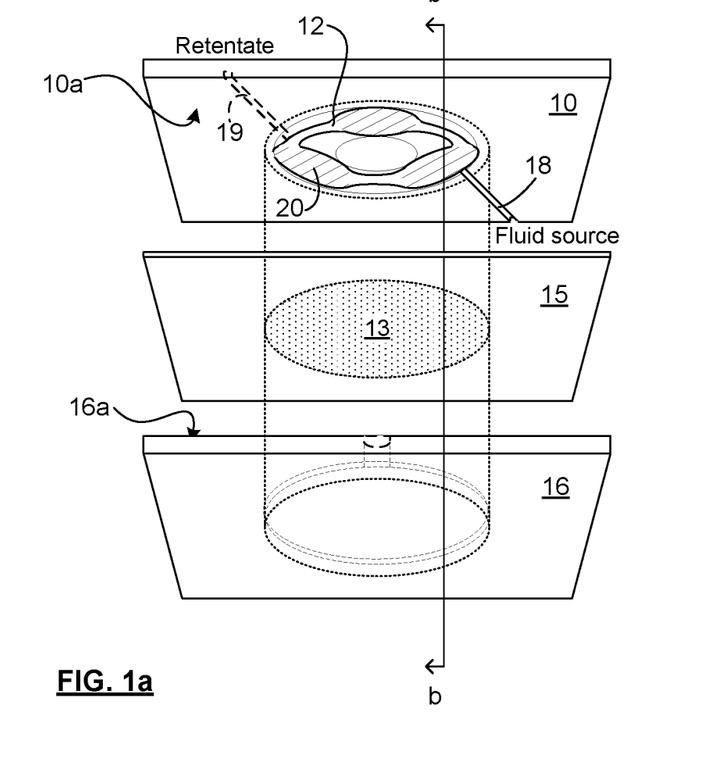
FIGS. 1a,b are schematic illustrations of exploded and cross-sectional views of a three layer microfluidic separator, in accordance with an embodiment of the invention.
Figure 1B:
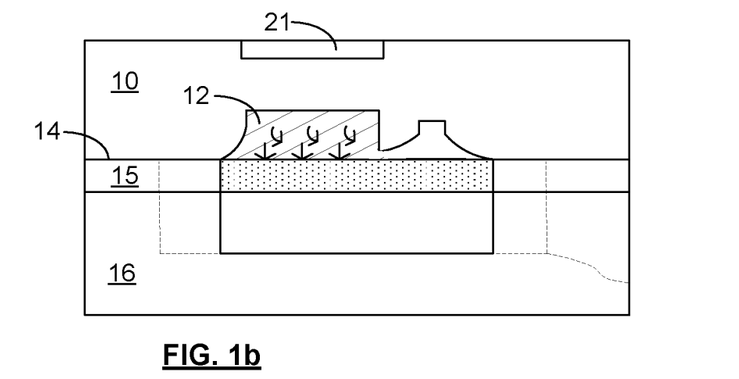

FIGS. 1a,b are schematic illustrations of a three layer microfluidic separator in exploded and assembled cross-ssectional views, respectively. The microfluidic separator includes a peristaltic pump layer 10, preferably formed of a thermoplastic elastomer (TPE) or other material that communicates a force, having a first meeting surface 10a that is patterned to define a channel 12 at an interface 14 between peristaltic pump layer 10 and separating member 15. Intimate bonding of peristaltic pump layer 10 and separating member 15 is typically relatively easy if suitable materials are chosen. Similar to the top layer 10, a filtrate layer 16 is provided that has a first meeting surface 16a patterned to produce a space for, or conduit for filtrate, bonded to the separating member 15 at an opposite side of the separating member 15.

Separating member 15 is schematically illustrated as a filter, and is preferably defined in a relatively rigid material. It will be appreciated that the separating member 15 may be a surface filter, a depth filter, an electroosmotic filter, an electrophoresis gel, a membrane, an osmosis or reverse osmosis membrane, or a chemically activated membrane, a semipermeable membrane, a selectively permeable membrane, a biological membrane, a synthetic membrane, a passive membrane, an active membrane, an actuatable membrane, such as an electrically triggered actuable membrane, a charged membrane, a polarized membrane, a neutral membrane, a porous membrane, a gradient membrane, an organic membrane, an inorganic membrane, a liquid membrane, a gel membrane, a semisolid membrane, a solid membrane, a mesh, a porous solid membrane, an emulsion membrane, a reactive membrane, and a photoreactive membrane. Hereinbelow we have demonstrated the invention with solid plastic porous membranes, however given the turbulent flow generated, it is expected that the full range of fluid separators known in the art can be usefully joined with the peristaltic pump of the present invention to achieve improved filtration and reduced clogging or blockage.

The patterning of the surfaces 10a and 16a are aligned, and define a used portion 13 of the separating member 15, as the total area over which the fluid in the channel 12 may pass to the filtrate layer 16.

The channel 12 is in fluid communication with a source 18, and may further be coupled to a retentate sink 19. The channel 12 is a part of a closed microfluidic circuit (i.e. self-intersecting path). A closed circuit is preferred because it allows for a continuous filtration for any desired duration, without any additional microfluid control equipment (valves, micropumps, etc.) for removing and reinserting the fluid. It is preferred, but not necessary, that the whole of the closed circuit overlies the used portion 13, as is shown. This way the recirculation is continuously provided without removing the fluid from contact with the separating member 15. It will be appreciated that the recirculation, and/or pressure control points 20, can alternatively be provided at points where the fluid is not in contact with the separating member 15 (e.g. beside the used portion 13). For example, it may be preferable to place the pressure control points 20 away from the separating member 15 if the separating member 15 is composed of a membrane that cannot withstand an intended pressure applied directly to the pressure control points 20.

While the illustrated embodiment is shown having a substantially circular track having three enlarged pressure control areas 20, it will be appreciated that a wide variety of layouts for a closed circuit are equally possible. Instead of a simple ring is shown, it may be efficient to have multiple rings at different radii communicating between the pressure control areas, or to have multiple loops that are not concentric, as in a "FIG. 8" or topological rose of any number, or more generally a set of loops having some number of connections.

While three non-overlapping pressure control regions 20 are shown, there may be more, or they may be arrayed differently. In some embodiments, the pressure control regions 20 may overlap and effectively resemble a single pressure control area 20, but the operation of the device will have pressure at only one or more separate parts of the enlarged areas at a time, and the coordination of the pressure applied at the separated parts amounts to separate pressure control areas 20 for the present invention, even if the pressure is applied to every part of the channel at one point in the cycle or another.

A top surface (or intermediate surface) of the peristaltic pump layer 10 provides a region 21 aligned with each pressure control region 20, where the pressure is communicated to the channel 12. The pressure may be supplied as positive or negative actuation, in that the fluid may be circulated by cyclic releases in pressure along the channel, or by positive pressure being applied, in sequence. For example a vacuum pressure applied in region 21 (assuming it is closed) can lift a membrane expanding a volume of the pressure control region 20 to effect pumping, or an increase in pressure in the region 21 can be used to actuate the pressure control region 20. The region 21 may be actuated with pneumatic or hydraulic pressure; may also be electromechanically actuable, for example with known piezoelectric, or electroactive polymers; or may be actuable by the full variety of suitable mechanical devices known in the art.

There need not be a one-to-one relation between pumps for controlling the regions 21 and the pressure control regions 20. For example, some designs may have a plurality of pressure control regions 20 commonly actuated by a set of regions 21 that are coupled for concurrent operation, or for operation with an inherent time lag that is beneficial for the pumping operation within the channel 12.

There is a value for maximizing the used surface area 13, as this impacts efficiency of the separation. As best shown in FIG. 1b, in the illustrated embodiment, the used portion 13 is maximized by effectively tapering the channel 12, such that the channel 12 has a cross-section that decreases with greater distance from the interface 14 while providing the largest volume of the fluid within the pressure control areas (where the channel height is greatest, and there is less tapering).

Planar structures of a wide variety of materials are readily patterned. The separator as shown can be formed with a three layer design. A fourth layer may be provided to enclose the pressure regions to permit pressurized fluid control over the pressure regions, and to thereby independently control the pressures in the corresponding pressure control areas.

In use, the fluid to be separated is supplied via the port 18, and fills the channel 12. This may be accomplished by first priming the separator with a priming fluid, then supplying the fluid to be separated. The priming fluid may be removed through optional retentate port 19, and/or optional outlet in retentate layer 16, for example. The pressure control areas are actuated and relaxed sequentially to pump fluid around the closed microfluidic circuit.

EXAMPLES

Figure 2:
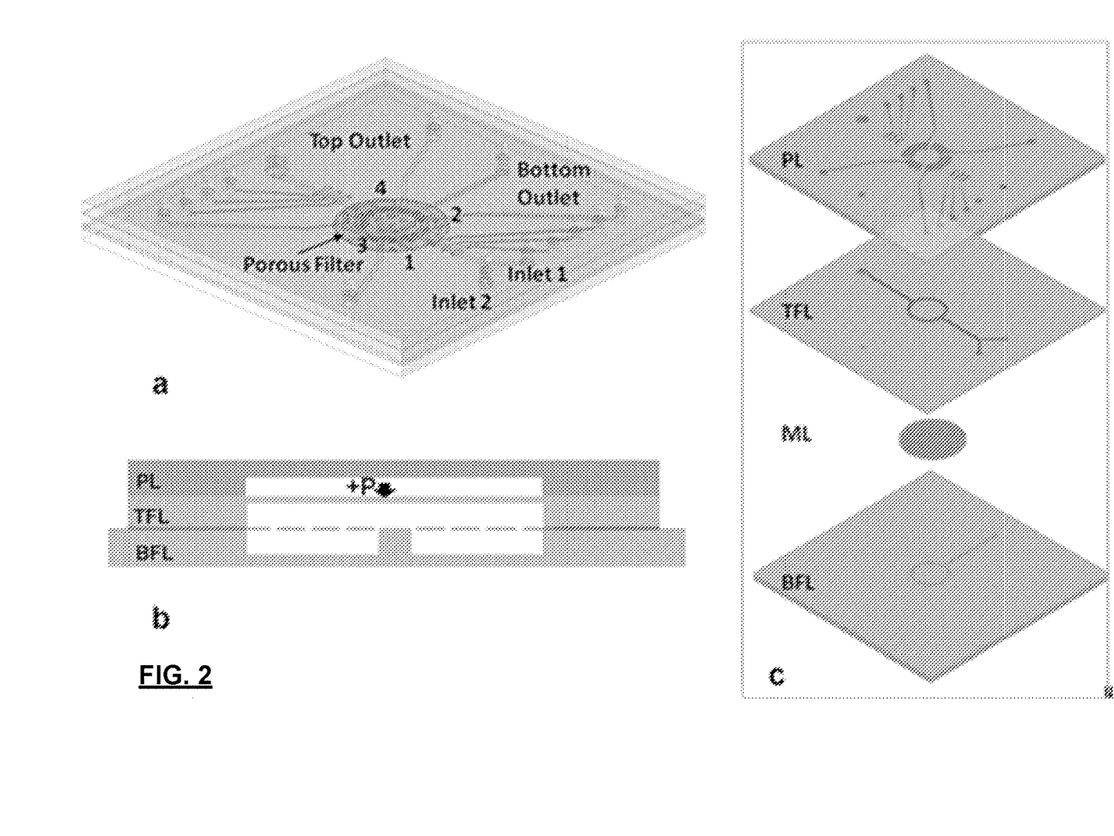
FIG. 2 is a schematic illustration of a test 4 layer microfluidic separator with a pneumatic control layer, in accordance with an example of the invention.

One example of a microfluidic separator is schematically illustrated in FIG. 2, which is a mosaic showing an assembled, transparent view a of the microfluidic separator, a cross-sectional view b of a microfluidic channel within the separator, and an exploded view c of the microfluidic separator. This separator was designed for particle/cell separation from an aqueous buffer or suspension. This device was fabricated in four layers: a bottom microfluidic channel layer (BFL), a) porous membrane layer (ML) formed of polycarbonate (PC), a top microfluidic layer (TFL) and a pneumatic air control layer (PL). The BFL, TFL, and PL were each formed of a thermoplastic elastomer (TPE), specifically Mediprene of 400M. The ML chosen for this example is a commercially available polycarbonate filter (EMD Millipore, Mass., US) with thickness in the range from 7 µm to 20 µm and with pore sizes from a few hundred nanometers to 10 µm. In order to avoid the collapse of the filter, some supporting pillars were added inside the microfluidic channel in the bottom microfluidic layer.

With this design, a thickness of the BFL was 1 mm (and according to the same design is preferably 1-3 mm), the TFL is 300+/−10 µm (and according to the same design preferably 0.2-0.3 mm, and the PL was 1 mm (and according to the same design is preferably 1-3 mm). The channel depth of the TFL was controlled to make sure that the thickness of the residue TPE (after patterning) was in a range that the integrated peristaltic microvalves and micropumps can be operated at low pneumatic pressure (smaller than 15 psi) and at the same time to achieve certain pumping rate (larger than 50 µl/min). This was accomplished by controlling the initial thickness of the TPE film sheet and the thickness of the features of the soft mold. The residual layer of the TPE of the TFL was controlled to be 100+/−5 µm (and according to the same design may be from 50-150 µm). This residue layer is used to control pressure in the pressure control areas during the operation of the peristaltic micropumping. The actuation can generate turbulent flow within the circular channel area of the device, and generally avoids or limits clogging of the filter.

Patterning was applied to form the BFL, TFL and PL quickly by hot embossing with soft (SU-8) molds (for details please see Applicant's WO 2012/109724, and U.S. Ser. No. 12/588,236 the contents of which are incorporated herein by reference). A pattern applied to the BFL consists of a circular channel coupled to a straight channel to an outlet. A pattern applied to the TFL has the pattern applied to the BFL with an additional ingress channel, which happens to be divided by a junction to permit two different inlets to access the circular channel. The circular channel is a simplest example of a closed microfluidic circuit. The straight channel and outlet of the TFL provide a retentate capture stream, although in alternative embodiments, this may not be desired or required. With this design, liquid component exchange between the top and bottom microfluidic channels can only happen in the circular channel area. The pneumatic air control layer is aligned with the top microfluidic layer, and there is no differentiation between the channel and pressure control areas of the circular channel, but for the alignment with the pressure regions of the PL.

Each pressure region is fan-shaped (defining an annular sector) and has a respective microfluidic channel and port that extend by vias to the top of the PL. Vias that couple the two inlets and retentate outlet of the TFL with a top of the PL, and the filtrate output of the BFL with the PL are provided after assembly. A plurality of additional valves are supplied (3) in both the ingress and retentate streams of the TFL, by corresponding chambers, and connecting microfluidic channels in the PL.

The assembling process of the integrated microfluidic device is quite straightforward. Once the BFL was patterned, the ML (polycarbonate porous membrane) is placed on top of the TPE layer to cover the circular channel area. Then the patterned TFL is placed in alignment on top of the BFL layer under an optical microscope to make sure that the circular channel on top layer is well aligned with its counterpart on the bottom layer. This is followed by placing the PL pattern-side down, on top of the TFL under an optical microscope to make sure that the air chambers are well aligned with the circular channel of the top microfluidic layer. Finally a hard thermoplastic cover (Zeonor 1060R) with connecting ports is bonded on top of the assembled device. The PL is patterned and is laid the top of the TFL.

Figure 3A:
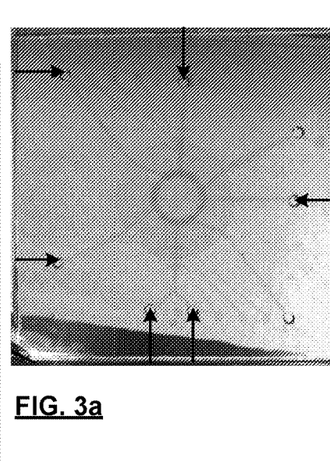
FIGS. 3a,b are images at two magnifications of a test microfluidic separator of FIG. 2.
Figure 3B:
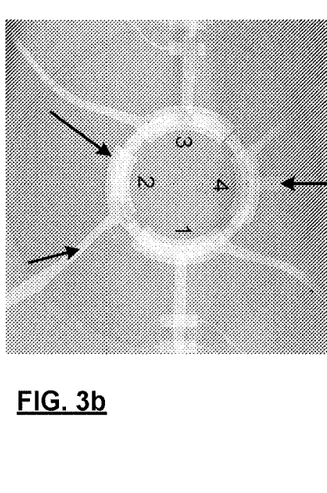

FIG. 3a,b are photographs of this example. FIG. 3a shows the majority of the microfluidic separator from a top surface. Arrows from the bottom show the two symmetric inputs for the fluid to be separated; arrows from the left are two of the pneumatic ports of adjacent pressure regions, the arrow from the top is the via to the TFL for the retentate flow, and the arrow from the right is a via to the BFL for the filtrate flow. FIG. 3b is an enlargement featuring the closed microfluidic circuit. The three arrows of FIG. 3b point to the filtrate channel (near 3 O'clock) that has pillars in the channel for support; a channel for the fan-shaped pressure region (near 8 O'clock), and that fan-shaped pressure region (near 10 O'clock). An outline of the circular filter can be seen from this image, as well as the whiter circular channels, and connecting channels. Two of the three valves on the source and retentate channels are also visible at the bottom and top. It will be noted that one of the pressure control regions and its pressure area overlies the ingress supply (1), a second pressure control regions and its pressure area (2) does not overly any coupling to the circular channel, a third pressure control region and pressure area overlies the retentate channel (3), and a fourth overlies the filtrate (4).

As mentioned above, supporting pillars were fabricated in the middle of the BFL to avoid collapsing of the ML on the bottom channel, and were also included in the filtrate channel. The pillars had 200 µm diameters, with 1 mm spacing.

It will be appreciated that in some embodiments it is desirable to provide a high surface area or large volume for the filtrate. For example, the separator may be involved in a process that has a step of incubation subsequent to filtration. If so, it may be desirable to provide an enlarged chamber for the filtrate to congregate. To prevent collapse of the ML, a number of strategies could be employed, including providing a local planar reinforcement directly beneath the pressure control areas. In some cases a fluid pressure drop across the ML itself could lead to collapse or unwanted distortion of the ML. In such cases, an array of pillars, posts, ridges or other supports may be provided.

Figure 4:
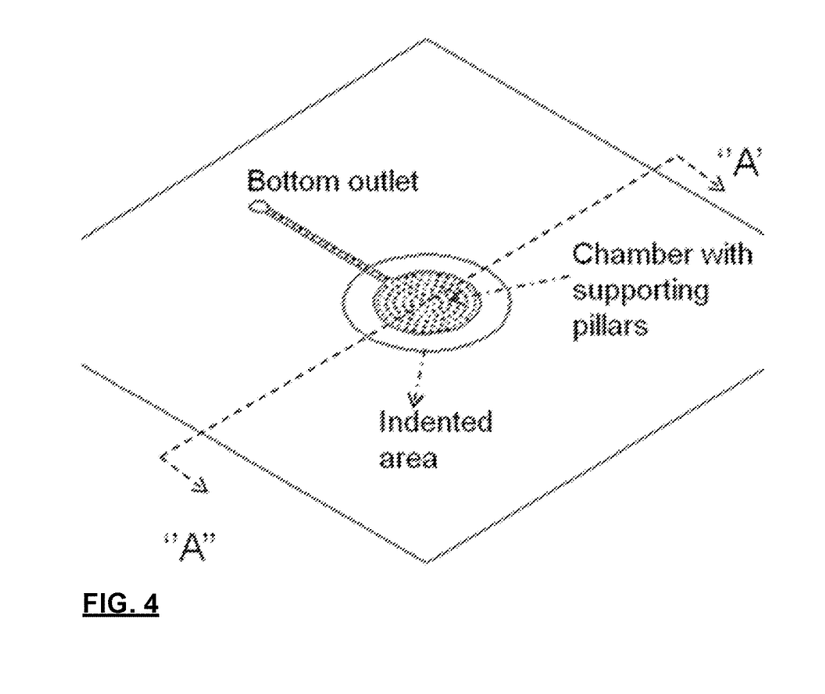
FIGS. 4 and 4a are images in a top view and cross-sectional view of an alternative bottom layer for the test microfluidic separator of FIG. 2.
Figure 4A:
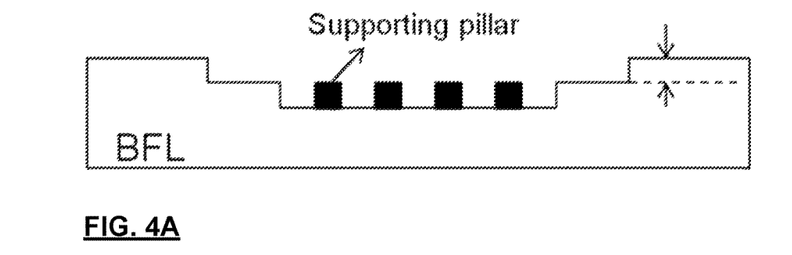

FIGS. 4, and 4A schematically illustrates an alternate embodiment of the BFL. FIG. 4 is a view of the BFL bearing a different pattern, but usable in combination with the ML, TFL, and PL of FIGS. 2,3. FIG. 4a is a cross-sectional image along A. The pattern applied to BFL involves substantially evacuating a disk with a circular-walled cavity, and supporting the cavity with an array of pillars. In the illustrated embodiment, a recess is provided for the ML, which may be desirable if the thickness of the ML is high enough that concerns about sealing around the edge arise. Applicant has found that membranes having thicknesses of about 7-20 µm may not require such a recess. It is noted that a similar recess could alternatively be provided in a TFL, and such pillars or the like, may be desirable in conduits of the TFL. It will be understood that depending on a thickness of the ML, there may be no need for such a recess, as a seal may be provided by a bond between the BFL and TFL, and either (or both) of the BFL or TFL and a periphery of the ML. Advantageously, the circular chamber can be slightly bigger than the outer diameter of the circular channel on the TFL, but smaller than the diameter of the ML, so that the effective filtering area is not limited by the BFL, and there are fewer constraints in the alignment between the TFL and BFL during the device assembly.

Figure 5:
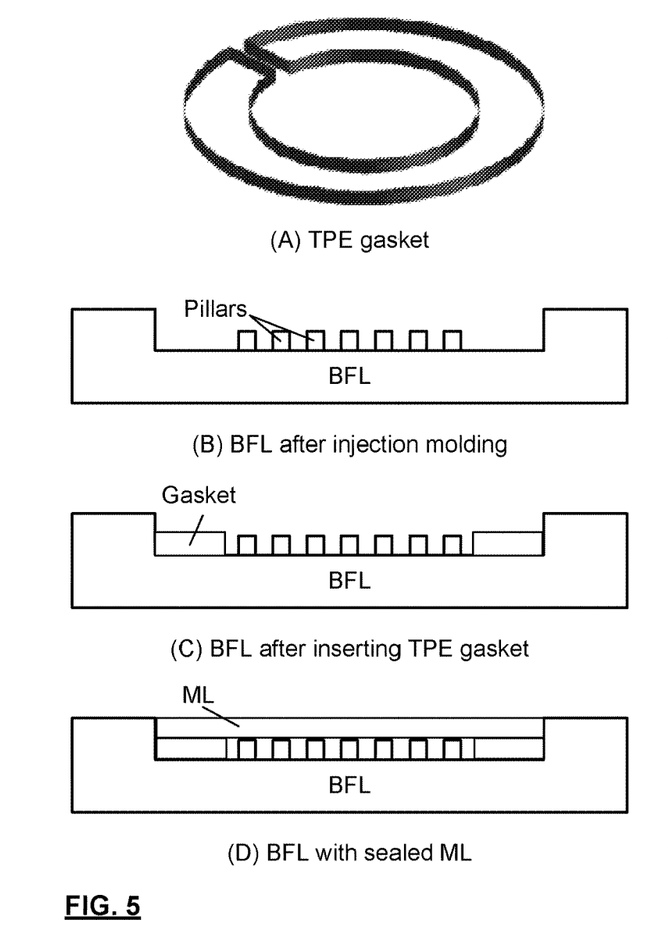
FIG. 5 is a schematic illustration of a process for fabricating and assembling a further alternative embodiment of the bottom layer of the test microfluidic separator of FIG. 2.

FIG. 5 schematically illustrates 5 steps in producing a BFL in accordance with yet another embodiment, that equally cooperates with the embodiment of FIGS. 2,3. The BFL may be preferably provided in a harder plastic, or glass (Zeonor 1060R, for example, which bonds readily and securely to TPEs), and may be cost effectively mass produced by injection molding. For similar reasons, the PL may be composed of the same material as the BFL. The BFL may have a high surface area functionalized surface, such as provided by the pillar array, for example.

If the material of the BFL, does not readily seal against the ML, a TPE gasket (step A) may be provided. The gasket could have a variety of shapes, sizes and contours, in dependence on the layout of the BFL, but in the illustrated embodiment, an opening of the ring-like TPE gasket is aligned with a channel on the BFL layer so that the liquid after passing through the PC filter to the circular chamber, flows to the bottom outlet on the BFL. The BFL may be formed with the ML in mind (step B), and provide pillars for supporting the ML. The gasket is inserted into the BFL, to seal against a floor of the BFL, as shown in step C. Then, in step D, the ML is inserted and sealed against the gasket. Assuming the TFL inherently provides a material for bonding and sealing to the ML and BFL, the aligned placement of the TFL will then be sufficient for enclosing the sealed channels and areas.

Figure 6A:
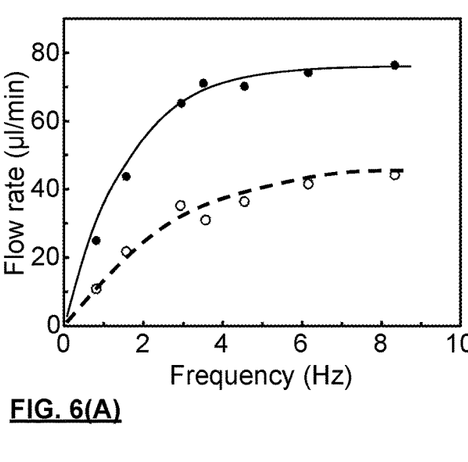
FIGS. 6(A) and (B) are graphs showing filtrate and retentate flow rates as a function of the operational frequency (A) and the applied pneumatic air pressure (B) for the test microfluidic separator of FIG. 2.

The performance of the flow characteristics of the separator of FIG. 3 has been studied. The microfluidic separator shown in FIG. 3 was assembled and the ports of the microfluidic device were coupled to a home-made 12-channel pneumatic control manifold. It consists of 24 electromagnetic valves. Opening and closing operations are controlled by Lab View Software. The maximum output pressure of the manifold is 30 psi. FIG. 6(A) is a graph of the pumping rate of the device as a function of the operational frequency at pneumatic air pressure of 9 psi applied when the filtrate is closed and retentate is open (solid circles) or when the retentate is closed and filtrate is open (hollow circles). In general, the pumping rate (flow rate) increases with increasing operational frequency from less than 1 Hz, to nearly 9 Hz. Flow rates as high as 40 µl/min through the ML were observed. The cycle used is described below as operation as two synchronous positive displacement pumps.

Figure 6B:
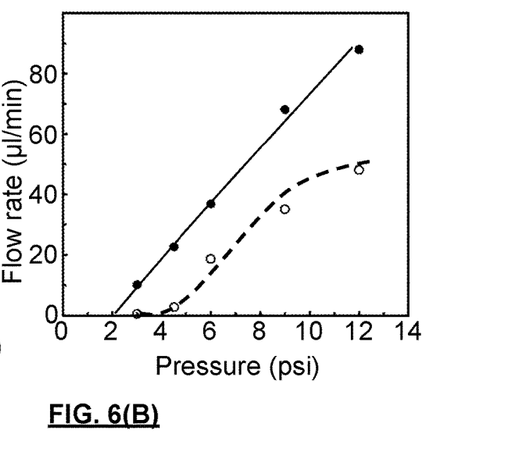

FIG. 6(B) shows the pumping rate of the device as a function of the applied pneumatic air pressure at a fixed operational frequency of 3 Hz for the same two cases with the same labels as in FIG. 6(A). The pumping rate (flow rate) increases with increasing applied pressure when the operational frequency is fixed. The device can operate at quite high flow rate with relatively small applied pressure.

By balancing flow resistances of the retentate and filtrate streams high flow rates around the closed microfluidic circuit can be achieved while promoting high efficiency filtration. These flow rates allow for turbulent flows, at least within the closed circuit, which is conducive to clearing blockage at the surface of the ML, decreasing a likelihood of blockage, and increasing a throughput of filtrate components of the stream even in the event of partial blockage.

The peristaltic micropump (for example for pumping fluid from the source to the retentate, as shown in FIG. 3b) may be operated by the activation of four pressure control surfaces arranged at four cardinal points on the circular channel by treating two branches of the closed circuit as two synchronous positive displacement pumps, that is, with a cycle comprising: Step 1) Air is injected inside all the four pressure regions to an operating pressure, causing the closed cavities within the pressure regions to swell, shrinking a volume within the corresponding four pressure control areas. Step 2) 3 staged release of the pressure control area 1, followed by pressure control areas 2 and 4, and finally release of pressure control area 3 is released, drawing the liquid in stages from the ingress toward pressure control area 3. Step 3) is a three stage pressurization of the imbibed fluid, which is step-wise pressurized and expelled. Pressure control area 1 is first pressurized while pressure control areas 2, 3, and 4 are kept in the vented state. This pushes a fraction of the stroke volume of the liquid back to the ingress and the remainder of the stroke volume is forced towards the retentate. If the resistance of the fluid flow through the membrane is less than the resistance towards the ingress, the smaller fraction will be drawn retrograde towards the ingress. Once pressure control area 1 is pressurized, there is a substantial reduction in any further retrograde flow during the cycle. With pressure control area 1 kept under pressure, pressure control areas 2 and 4 are simultaneously pressurized, followed by the pressurization of pressure control area 3 once pressure control areas 2 and 4 are completely or substantially pressurized. The cycle has therefore returned to step 1. This forms two parallel and synchronous positive displacement pumps. This cycle may be preferred with the retentate stream closed, or substantially closed in which a bulk of the flow is forced through the membrane, as a purification step where a small amount of impurities are expected.

A significant advantage of this control scheme is that no flow control is required other than the peristaltic pump. The operation of the pump is sufficient to imbibe the fluid, and drive it through the retentate and filtrate streams. Nonetheless improved operation can be provided by impeding retrograde flow, or suppressing retentate and or filtrate flows during the steps 2 with additional valves, or flow control means, if well timed and responsive, for example, with precisely timed actuation of the valves shown in FIGS. 2,3.

There are several pumping operations, which can be used for different purposes for particle separation/sorting, that better use of the pressure control areas to selectively drive filtrate and retentate streams. For example, the valve between the top circular channel and the retentate may be closed during a first part of a cycle. For example the steps 1 and 2 described above can be performed to imbibe the fluid during a first phase of the first part, and the fluid can be retained within the circular channel for a second phase of the first part. Following the second phase, the retentate vale is opened, to remove the retentate, and a completion of the step 3 is used to remove the retentate, preparing the separator for closure of the retentate valve and step 1.

During the second phase a variety of processes can be observed to selectively drive a filtrate stream. A first example: pressurizing pressure control area 1, and then pressure control area 3 will result in some loss of fluid as retrograde flow, and a pressurization of the fluid between the retentate valve and pressure control area 3, but as long as the fluid resistance through the ML is lower than these, the bulk of the fluid will be trapped in the circular channel, and expressed through the ML. Subsequent pressurization of the pressurizing pressure control areas 2 and 4 with the pressure retained at pressure control areas 1, and 3 will further drive the fluid through the ML efficiently. Such a progression will selectively drive a filtrate stream.

A second second phase process, that may advantageously be used in alternation with the first example, involves selectively circulating the flow in the circular channel. This can be performed by cycling pressure to the pressure control areas in sequence. This may involve keeping substantially one, two or three of the pressure control areas relaxed at a time. If two are open at a time, they can be neighbouring or opposite pressure control areas, leading to effectively one or two waves per iteration. Each time the pressure control area 1 relaxes, more fluid is drawn in, and filtrate streams may freely flow throughout this process, but a pressure balance is obtained throughout this process if the number of relaxed pressure control areas at a time remains fixed, and the filtrate flow will balance with the drawn fluid to make for an effective flushing of the ML. In some applications, a flow control valve may be provided in the filtrate stream, which can be operated to avoid the nominal filtrate flow during a cyclic pressure, for example if the liquid is a flush and the process is being performed to improve recovery of the retentate.

As a variant of the second second phase process, a pressure can build up (or diminish) within the circular channel by gradually decreasing (or increasing) a number of pressure control areas relaxed at any given instant.

Thus it is possible, with suitable pressure control schemes, to provide a range of processes that will have various balances of fluid pressures between the retentate and filtrate streams, as may be desired in different processes or with different operations during sorting, separating, or cleaning, priming and pumping. The process can be chosen, tested or improved, empirically, semi-empirically, or via a microfluidic model. Sensors and feedback can be incorporated into a controller for controlling the actuation at the pressure regions.

While the foregoing example considered the two channels to the circular channel to be a source ingress and a retentate stream, it is appreciated that in other embodiments, a mixed stream may be filtered using this separator. Both streams may be introduced by respective channels, and mixed in the circular channel. An example of a process for mixing and filtering would be to start with all pressure control areas pressurized, relaxing pressure control areas 1 and 3 to imbibe some of the two fluids, relaxing pressure control areas 2 and 4 to draw the imbibed fluids into the circular channel, at which point the fluids can be subjected to a series of processes that respectively circulate and express the mixture to various degrees, followed by pressurizing pressure control areas 1 and 4, and then pressurizing pressure control areas 2 and 3 to express the mixture, and return the apparatus to the initial state.

It will be noted that the only applications requiring independent actuability of all four pressure control areas is the second second phase progression (and its variant). Thus for some applications of the invention, where sufficient circulation is provided to avoid clogging without requiring such a process, the pressure regions 2 and 3 can be commonly applied by a single force actuator. Similarly, in the mixing filtering operation pressure regions 1 and 4 can be commonly applied by a single force actuator, which can considerably simplify the control systems.

Since the device possesses both mixing and separating functionalities, a straight forward application (in addition to that for cell separation) of this type of device is in the use of DNA target capture and release. For example, a stream of beads coated with DNA affinity adsorbent and a stream of target DNA solution are brought simultaneously into the circular channel. By actuating the integrated peristaltic micropump in the mixing mode, the target DNA could be efficiently bound on the beads that will be captured on the surface of the filter. The attachment of DNA on the beads could be maximized by circulating the stream of target DNA from the filtrate flow back to the ingress and then mixing again and again with the beads captured on the filter. Those non-specific binding DNA on the beads could be washed by circulating washing buffer into the circular channel. The specific bound DNA on the beads can be released by pumping the specific elution buffer inside the circular channel and mixing with the captured beads by actuating both the mixing and pumping modes and eventually collected from the filtrate channel for further analysis.

Figure 7:
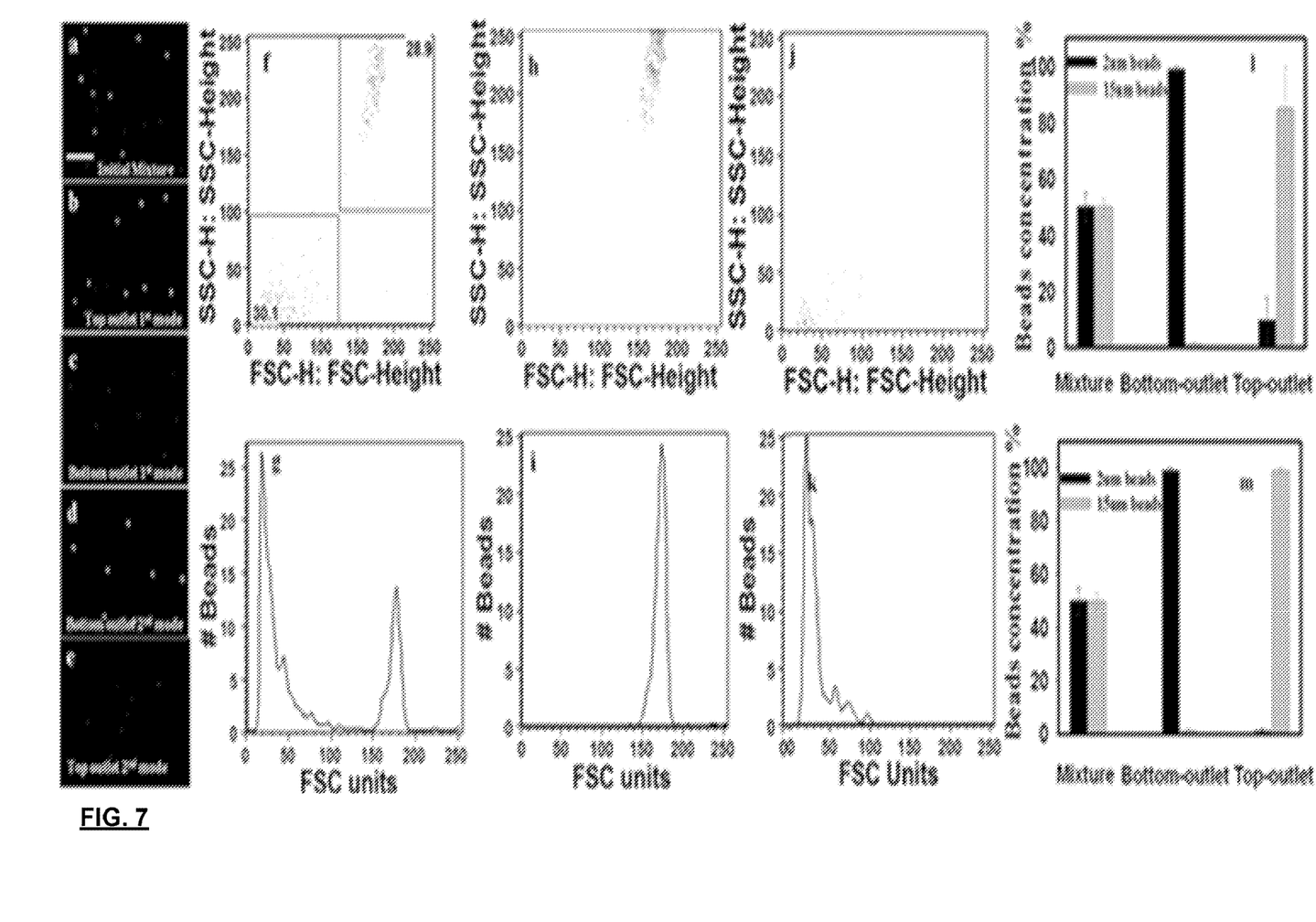
FIG. 7 is a panel of graphs and selective fluorescence microscopy images showing microbead separation using the test microfluidic separator of FIG. 2.

The operation of the microfluidic separator has been demonstrated. FIG. 7 is a mosaic of results of this demonstration. The demonstration used the separator shown in FIG. 3, using the materials and methods described above, except that the pore size of the filter used in the device is 10 µm. The control system used was the same as described above. In this experiment, 15 µm green and 2 µm blue fluorescence polystyrene mirobeads suspension was prepared in deionized water with a concentration of $5 \times 10^4$ p/ml each. Mixed suspensions were then prepared with equal volumes of each suspension. Initial and collected samples at each outlet were analyzed with an inverted fluorescence microscope (Nikon TE-2000-E). Collected microbeads were further analyzed using a Fluorescence Activated Cell Sorting (FACS) system. Separated nano size particles were also assessed using a Multi-Angle Particles Sizer (Brookhaven Instruments Corporation).

Bead separation was performed applying two different pumping modes, and the efficiency of each was investigated. The first pumping mode operated in the following manner: the additional valves to the retentate streams were closed and the microbeads mixture entered from the ingress stream, then passed through the membrane to the bottom outlet. This filtration step was followed by washing of the membrane using the same pumping mode (where the ingress stream supplied bead-free liquid) to remove any remaining small beads. At the end, the additional valves for the retentate stream were opened and the bigger beads exited from the top outlet. For the second pumping mode (FIG. 3(*b*)), both the retentate and ingress streams were used as inlets. The beads mixture entered through the ingress stream, and bead-free liquid was introduced from the retentate stream. After filtering the mixture, a washing step was performed using the same pumping mode to remove any small beads, by closing the additional valves of the ingress stream. Finally, by reversing the pressure on the retentate stream, the flow was directed towards the top outlet and bigger beads were collected at this outlet.

A right hand band of images are selective fluorescence microscopy images labeled a to e. Selective fluorescence microscopy image a is representative of the initial mixture, having substantially equal parts of (2 µm) and (15 µm) microbeads. Images labeled b and c and d and e respectively represent the top outlet (retentate) and bottom outlet (filtrate) streams for the first mode and second mode of pumping (control scheme). It is noted that substantially no green fluorescing microbeads are found in either filtrate stream, and that the retentate stream of the first mode (b) shows approximately 2 of 10 beads fluoresce blue, and none fluoresce blue in image d.

Graphs f and g are plots of fluorescence activated cell sorting (FACS) images for size distribution of the initial mixture. Graphs h and i are the FACS images for a size distribution of collected samples at the top outlet (retentate) by applying the second pumping mode. Graphs j and k are the FACS images for size distribution of collected sample at the bottom outlet (filtrate) by applying the second pumping mode. Bar charts l and m show mixed beads initial concentration and collected beads concentration at the top and bottom outlet channels by applying the first (l) and second (m) pumping modes respectively.

The separation efficiency was defined as the ratio of the number of the target particles to the total number of particles collected at each outlet.[18] The second mode was demonstrated to be substantially flawless.

Figure 8:
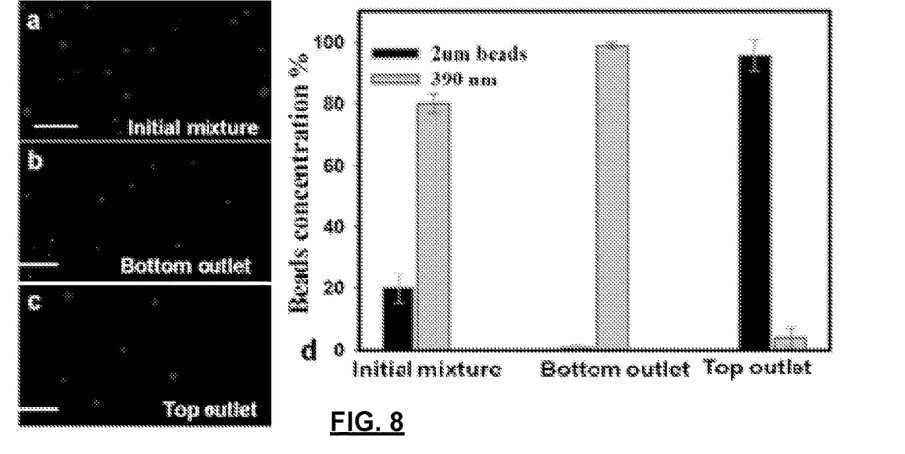
FIG. 8 is a panel of graphs and selective fluorescence microscopy images showing micro/nano-bead separation using the test microfluidic separator of FIG. 2.

The separator was also tested for sub-micrometer size bead separation. In this experiment, 390 nm particles suspension was prepared in deionized water with a concentration of $4.5 \times 10^5$ p/ml. It was then mixed with 2 μm microbeads suspension prepared at a concentration of $1.5 \times 10^4$ p/ml with equal volumes of each suspension. FIG. 8 has panels labeled a-d. Panels a-c are selective fluorescence microscopy image of an initial mixture, bottom outlet (filtrate), and top outlet (retentate). Panel d shows a bar chart showing less than about 5% cross-contamination in the retentate. In principle, the invented device can be applied for separation/sorting of even smaller nanoparticles since PC filters with pore size below 100 nm are commercially available. A wide variety of other filters, active and passive, can also be used, and take advantage of the turbulent flow and flexibilities of the peristaltic pump microfluidic separator of the present invention.

Figure 9:
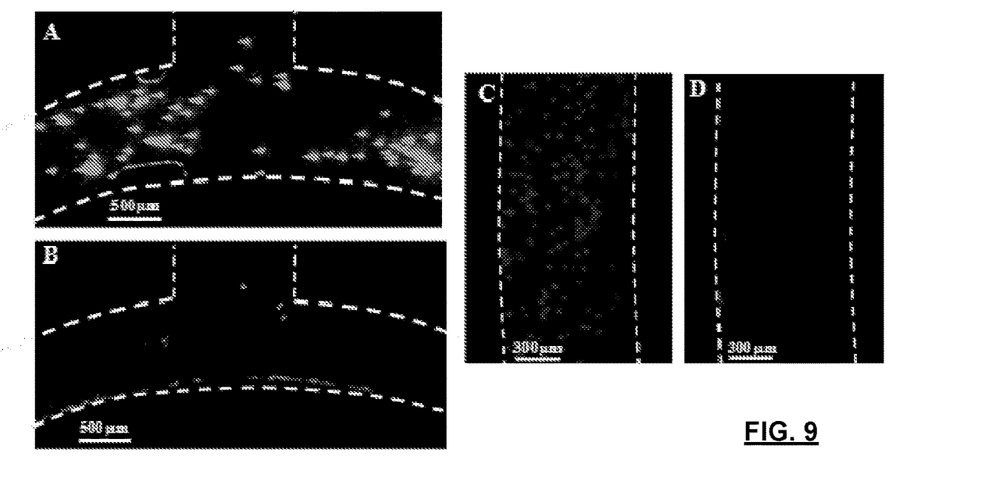
FIG. 9 is a panel of selective fluorescence microscopy images of the test microfluidic separator of FIG. 2, showing the effective washing of retentate.

FIG. 9 shows the ML surface area in the circular channel at different steps of separation process for the separation of 2 μm-15 μm and 2 μm-390 nm particles. FIG. 9A is a fluorescence image of the membrane surface after the separation of 2 μm microbeads from 15 μm microbeads, using only the first pumping strategy (retentate stream closed) using the 10 μm pore size chip. 15 μm beads remain on the membrane surface. The same surface area is shown in FIG. 9B after the washing step with closed filtrate stream, and pumping of bead-free liquid. Very few beads remained on the membrane surface. FIGS. 9C and 9D are also fluorescence images, but from the surface of the 800 nm membrane in the circular channel (TFL side), after collecting 390 nm particles, and after a washing step, respectively. Almost all of the 2 μm beads attached to the membrane surface at this area were detached and collected. These results indicate the effect of a turbulent flow to detach and collect beads from the membrane surface. Therefore the fabricated device can be repeatedly used without any need for further cleaning of the membrane area.

Figure 10:
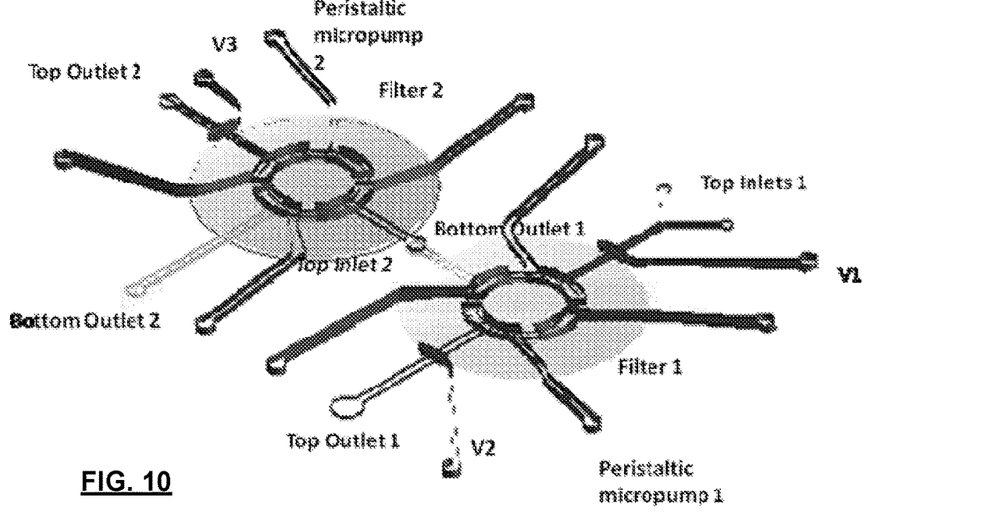
FIG. 10 is a schematic illustration of a 2 stage microfluidic separator in accordance with another example, the second stage having a separator that filters equally fine or finer flow components than the first.

FIG. 10 schematically illustrates an example of two peristaltic pump microfluidic separators on a single device, with the filtrate flow of the first providing a source for the second. A via is used to interconnect these two layers in series. A first retentate, being the retentate of the first microfluidic separator, will have the fluid components that did not pass the first membrane, which is either a different kind of membrane, or a membrane of finer porosity than the first membrane. The retentate of the second membrane will have fluid components that were passed by the first membrane, but not the second. A filtrate of the second separator provides the fluid components passed by both membranes. Thus separating or sorting three different types of particles is possible with this device. In general, an array having multiple separators is possible.

Again, the integrated microfluidic device mainly consists of the same four layers as what mentioned before. Therefore, there is no complexity increased in term of the fabrication. Thus an integrated microfluidic device can be rapidly fabricated for separating/sorting with more than 3 different sizes.

Parallel traces of pressure control lines to corresponding pressure regions of respective separators can permit consolidated control and pneumatic ports and equipment to operate the respective peristaltic pumps.

Figure 11:
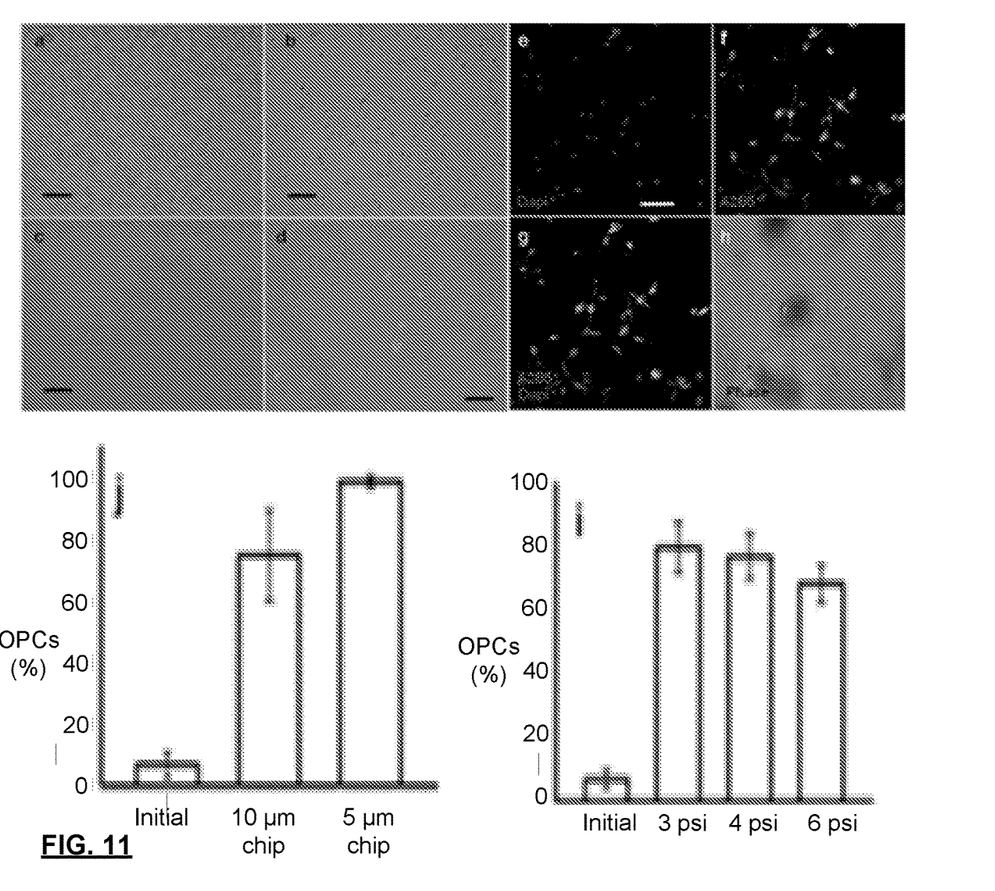
FIG. 11 is a panel of selective fluorescence microscopy images and graphs showing cellular filtration using the test microfluidic separator of FIG. 2.

The fabricated device was applied for the application in the separation of the oligodendrocyte progenitor cells (OPCs) from microglia and astrocytes which were extracted from rat central nervous systems. OPC mixed primary cultures were prepared from brains of new born Sprague-Dawley rats. The meninges and blood vessels were removed from the cerebral hemispheres in Ham's F-12 medium. The tissues were gently forced through a 230-μm nylon mesh. Dissociated cells were then gravity-filtered using the same type of mesh. This second filtrate was centrifuged for 7 min at 1000 rpm, and the pellet was re-suspended in Dubecco's Modified Eagle's Medium (DMEM) supplemented with 12.5% fatal calf serum, 50 units/ml penicillin, and 50 μg/ml streptomycin. Cells were plated on poly-L-ornithine coated 75-cm² flasks and incubated at 37° C. with 5% $CO_2$. The mixed cell flasks were then used for subsequent separation experiments. OPCs formed less than 10% of the primary cell cultures, which are considered rare cells. OCPs were enriched at least 10 fold, and the separation efficiency of OPCs can reach up to 95% (FIG. 11). The separation efficiency depends on the pumping mode mentioned previously, and also the operating pressure. Graph i shows OPCs separation efficiency at three different operating pressures. The separation efficiency is slightly higher when the device works at low pneumatic pressure (3 psi), which can be interpreted as: some of the microglia and astrocytes cells whose size are close to 10 μm can squeeze and pass through the filter, the number of those cells squeezed and passed through the filter is decreased with decreasing the operation pneumatic pressure. Our experiments also showed that the separated cells were still biologically functional and differentiated into mature oligodendrocytes.

In conclusion, experimental verification of peristaltic pump microfluidic separators has been accomplished using a variety of separation problems, and good evidence of turbulent flows have been shown. It is expected that the use of the peristaltic pump microfluidic separators have substantial advantages over prior art, that were not expected by those of ordinary skill.

REFERENCES

1. T. F. Didar and M. Tabrizian, *Lab on a Chip,* 2010, 10, 3043-3053.
2. A. Lenshof and T. Laurell, *Chemical Society Reviews,* 2010, 39, 1203-1217.
3. K. Sun Min, L. Sung Hoon and S. Kahp Yang, *Lab on a Chip,* 2008, 8, 1015-1023.
4. I. Barbulovic-Nad, X. Xuan, J. S. H. Lee and D. Li, *Lab on a Chip,* 2006, 6, 274 279.
5. C.-C. Lin, A. Chen and C.-H. Lin, *Biomedical Microdevices,* 2008, 10, 55-63.
6. A. Jonas and P. Zemanek, *ELECTROPHORESIS,* 2008, 29, 4813-4851.
7. M. M. Wang, E. Tu, D. E. Raymond, J. M. Yang, H. Zhang, N. Hagen, B. Dees, E. M. Mercer, A. H. Forster, I. Kariv, P. J. Marchand and W. F. Butler, *Nature Biotechnology,* 2005, 23, 83-87.
8. E. K. Dirican, O. D. Ozgun, S. Akarsu, K. O. Akin, O. Ercan, M. Ugurlu, C. Camsari, O. Kanyilmaz, A. Kaya and A. Unsal, *J. Assist. Reprod. Genet.,* 2008, 25, 375-381.

9. K. Hoshino, Y.-Y. Huang, N. Lane, M. Huebschman, J. W. Uhr, E. P. Frenkel and X. Zhang, *Lab on a Chip,* 2011.
10. Y. Zhou, Y. Wang and Q. Lin, *Journal of Microelectromechanical Systems,* 2010, 19, 743-751.
11. D. Issadore, H. Shao, J. Chung, A. Newton, M. Pittet, R. Weissleder and H. Lee, *Lab on a Chip—Miniaturisation for Chemistry and Biology,* 2011, 11, 147-151.
12. A. Nilsson, F. Petersson, H. Jonsson and T. Laurell, *Lab on a Chip,* 2004, 4, 131-135.
13. L. R. Huang, E. C. Cox, R. H. Austin and J. C. Sturm, *Science,* 2004, 304, 987-990.
14. J. Takagi, M. Yamada, M. Yasuda and M. Seki, *Lab on a Chip,* 2005, 5, 778-784.
15. A. A. S. Bhagat, H. W. Hou, L. D. Li, C. T. Lim and J. Han, *Lab on a Chip,* 2011, 11, 1870-1878.
16. J. Zhu, T. R. J. Tzeng and X. Xuan, *ELECTROPHORESIS,* 2010, 31, 1382-1388.
17. S. S. Kuntaegovvdanahalli, A. A. S. Bhagat, G. Kumar and I. Papautsky, *Lab on a Chip,* 2009, 9, 2973-2980.
18. Y. Luo and R. N. Zare, *Lab on a Chip,* 2008, 8, 1688-1694.
19. H. Wei, B. H. Chueh, H. Wu, E. W. Hall, C.-W. Li, R. Schirhagl, J.-M. Lin, and R. N. Zare, Lab on a Chip, 2011, 11, 238-245.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. A method for separating components of a fluid, comprising:
    providing a self-intersecting micro- or nano-fluidic channel defining a cyclic path over a receiving surface of a porous membrane;
    supplying into the channel a fluid entraining particles to be separated; and
    applying coordinated pressure to the channel at a plurality of pressure control areas along the cyclic path to circulate the fluid over the receiving surface, the coordinated pressure effective to apply a pressure on the fluid to effect a desired transmission through the membrane, and a circulating pressure to remove surface obstructions on the membrane, to reduce blockage of pores of the membrane by the particles.

2. The method of claim 1 further comprising applying the coordinated pressure for a predefined duration, while continuously injecting the fluid into the channel.

3. The method of claim 2 further comprising after continuously injecting the fluid until the fluid is spent, or a retentate contains too much material that cannot pass through the membrane, dispensing a flushing fluid to flush the retentate from the channel.

4. The method of claim 3 wherein dispensing a flushing fluid Comprises actuating a valve to close a supply of the fluid, or a filtrate in fluid communication with the membrane to receive the transmission, or to open a retentate outlet.

5. The method of claim 1 wherein applying coordinated pressure to the channel comprises applying pressure to regions of a layer overlying the pressure control areas, by controlled delivery of pressurized fluid to the regions.

6. The method of claim 1 wherein providing the channel comprises bonding a thermoplastic elastomeric layer at a first patterned surface to the membrane.

7. The method of claim 6 wherein the thermoplastic elastomeric layer is substantially flat, and of substantially uniform thickness, and each pressure control area extends substantially perpendicular to the broad surfaces of the layer.

8. The method of claim 1 wherein applying coordinated pressure to the channel at a plurality of pressure control areas comprises applying pressure against a structural reinforcement between the pressure control areas and respective parts of the membrane.

9. The method of claim 1 wherein the channel away from the pressure control areas covers at least 25% of the receiving surface.

10. The method of claim 1 wherein applying coordinated pressure to the channel at the plurality of pressure control areas comprises applying pressure at the at least three pressure control areas where corresponding channel enlargements are provided.

11. The method of claim 2 wherein the continuous injection into the channel is provided via one of a first coupling for supplying a ingress fluid to be separated, that is distinct from a second coupling for removing a retentate.

12. The method of claim 1 wherein the porous membrane is: a surface filter, an osmosis or reverse osmosis membrane, a chemically activated membrane, an electroosmotic filter, an electrophoresis gel, a semipermeable membrane, a selectively permeable membrane, a biological membrane, a synthetic membrane, a passive membrane, an active membrane, an actuatable membrane, electrically triggered nanoporous membrane, a charged membrane, a polarized membrane, a neutral membrane, a gradient membrane, organic membrane, inorganic membrane, gel membrane, semisolid membrane, solid membrane, reactive membrane, or photoreactive membrane.

13. The method of claim 2 wherein a controller is provided to independently control pressure at the at least three pressure regions to actuate the at least 3 control areas to produce in the channel a positive displacement pump.

14. The method of claim 2 wherein injecting the fluid into the channel comprises injecting a filtrate or retentate stream from a distinct membrane, such that the membranes collectively are adapted for separating or sorting more than 3 types of particles.

15. A method for separating components of a fluid, the method comprising:
    providing a self-intersecting micro- or nano-fluidic channel defining a cyclic path over a receiving surface of a porous membrane;
    supplying into the channel a fluid entraining particles to be separated; and
    applying coordinated pressure to the channel at a plurality of pressure control areas along the cyclic path to circulate the fluid over the receiving surface, the coordinated pressure effective to applying a pressure on the fluid to effect a desired transmission through the membrane, and a circulating pressure to remove surface obstructions on the membrane, to reduce blockage of pores of the membrane by the particles,
    wherein the cyclic path, at least away from the pressure control areas, is bounded by the receiving surface.

* * * * *